3,328,327
BLENDING PROCESS
Elmer A. Anderson, El Cerrito, Robert J. Moore, Orinda, and Charles E. Sanborn, Walnut Creek, Calif., assignors to Shell Oil Company, New York, N.Y., a corporation of Delaware
No Drawing. Filed Oct. 24, 1963, Ser. No. 318,489
4 Claims. (Cl. 260—28.5)

This invention relates to the blending of polymers into hydrocarbon solvents. More particularly, it relates to the blending of polymers into relatively high molecular weight, normally solid hydrocarbon solvents such as waxes and low molecular weight polymers.

Petroleum-derived waxes have been used for many years to coat paper an dcarbon boards especially for use in wrapping and containing diary products and other food products such as bakery goods as well as for coating cloth, fibers, and food products including cheese and meats to render them moisture-vapor resistant. Such waxes, however, have an unfortunate tendency to crack and peel off the coated articles, especially when they are subjected to repeated flexing or severe creasing. Even waxes modified with polyethylene, while having some improved properties, show disadvantages relative to brittleness and lack of tensile strength particularly under low-temperature conditions.

In the last few years, the disadvantages which are normally attendant to the use of wax in coating applications have resulted in the significant supplanting of wax alone by the use of polymeric coatings, polyethylene in particular. However, despite the wide use of polyethylene-coated paper for a wide variety of packaging uses, such laminates have not been a panacea since they too lack many important properties. For example, polyethylene coatings lack the desired resistance to penetration by oxygen, grease, organic vapors and water vapors. In addition, polyethylene coatings have not been found to possess the desired amount of resistance to abrasion and flexing. As a result, there has been considerable interest in the incorporation of polymeric materials into wax for the purpose of benefitting from the most desirable properties of both. Thus, polymers such as ethylene-propylene copolymer, ethylene-vinyl acetate copolymer, ethylene-vinyl acrylate copolymer, various synthetic rubbers and the like have all been proposed for incorporation into wax.

However, one of the difficulties with wax-polymer systems such as those described above, is that it is difficult to blend such polymer into wax to obtain uniformly a homogeneous mixture. This is, of course, due to the inherently low solubility in wax of high molecular weight polymers, i.e., those having molecular weights from, say, 20,000 to as high as 5,000,000. Heterogeneity in blends of polymer in wax, when used in coating application, result in uneven coatings, poor processability, and discontinuities in the coatings which in some cases may even preclude use of the blend for coating purposes.

In order to overcome the concomitant tendency of polymers to separate from the wax in which they have been dissolved and later solidified, very severe mixing has been found to be necessary. Thus high shear rates, high mixing temperatures and long mixing times have been necessary to assure homogeneity of wax-polymer blends. Such extreme mixing conditions are not only highly expensive, but, more importantly, they can frequently result in degradation of the polymer as it is blended into the wax, thus reducing the efficacy of the polymer as a blending agent for wax.

Applicants have now discovered a simple but effective process for the blending of polymers and waxes whereby the above discussed difficulties involved in such blending operations are eliminated or at least substantially reduced. More specifically, applicants have found that when blending polymers with waxes, both being in the molten form but in the absence of any significant amount of lower molecular weight solvent, the ease of blending is substantially increased by the inclusion of certain quite small and narrowly limited amounts of wax into the polymer prior to blending with the major part of the wax. The invention will be better understood and described with particularity in the discussion which follows.

There are, of course, many ways of blending normally solid materials. For example, in the case of materials of the type being considered here, it is obvious that the polymer can be dissolved in a solvent and the wax added to the resulting polymer solution. Though by this method excellent homogeneity of the wax and polymer is obtained, it is nevertheless guite difficult to remove the solvent from the solution since the viscosity of solution is increased by each increment of solvent removed. Thus, it is practically impossible to remove all the solvent economically since it requires quite long evaporation time, extremely high vacuum and high energies of mixing. Even with such extreme conditions, the solvent removal may be incomplete, in which case the entrapped solvent can cause discontinuities in coatings made from the thus-blended material. Thus though the homogeneity of the polymer vis-a-vis wax is excellent, the entrapped solvent represents a potentially harmful second (vapor) phase which precludes the satisfactory application of the mixture from the molten state as a coating material.

Because of the disadvantages of the foregoing method, polymers are normally recovered separately by other means such as coagulation with water and/or steam, which is well known in the rubber industry. The resulting coagulated polymer or crumb is then washed and dried to remove the solvent therefrom. However, as outlined hereinabove, the blending of neat polymer with wax to attain homogeneous mixtures in quite difficult and costly.

To overcome many of the disadvantages of the previous methods of blending waxes and polymers, applicants have found that the preblending of only a small amount of wax into the polymer while it is in solution greatly facilities the subsequent blending of substantial amounts of wax with the polymer when both are in the molten form. More particularly, it has been found that the incorporation of from about 5 to about 20% by weight wax, basis polymer, into the polymer while it is dissolved in a solvent, i.e., into a polymer cement, greatly facilitates the subsequent mixing of the polymer with additional quantities of wax by other means such as with extruders, mills, Banbury mixers and the like by which such materials are blended in the molten or semi-molten form.

To incorporate the above-referred initial small amount of wax into the polymer, it is preferred that the polymer be in the form of a cement, that is a solution of the polymer in an appropriate solvent. Generally, the solvent will be a volatile hydrocarbon solvent since they are both readily available and inexpensive. Benzene, toluene, cyclohexane and isopentane are typical of such solvents. However, the particular solvent to be used may depend upon the nature of the polymer itself. Typical solvent types which are used for polymeric materials are low molecular weight cyclo paraffins, aromatics, carboxylic acids, ketones, alkyl esters, amines and ethers, chlorinated hydrocarbons, glycols, furfural and derivatives thereof, various heterocyclic materials such as lactams, etc. In any event, the exact character of the solvent is not relevant to the process of the invention within the obvious limitations that the solvent must also be volatile, inert and, of course, a solvent for the wax.

The concentration of polymer in the cement is likewise not particularly critical. It can therefore be quite dilute, for example, only 1% polymer or, on the other hand, quite concentrated, e.g., 80–90% polymer. However, the upper concentration is limited as a practical matter by handling limitations and by the ability of the solvent to dissolve the wax in addition to the polymer already dissolved therein. Therefore polymer cements containing more than about 30% will only rarely be employed because of the high viscosity of such cements, in which the polymer is present in a highly swollen form.

In circumstances where the wax is available at the site of polymerization, it is quite advantageous to dissolve the 5 to 20% wax in the polymer reaction solution, from which the polymer wax mixture may be recovered by coagulation and/or by evaporation of the solvent. By this means, only a single solvent recovery step is required and the equipment and operating costs of producing the final blend of wax-polymer are greatly reduced.

It is, of course, to be understood that polymers to be suitable for inclusion in waxes must be at least partially soluble in the wax. Thus, in general, linear polymers containing aliphatic hydrocarbon components relatively free (e.g., not over about 40 mol percent) of hydrophilic functional groups such as hydroxyl and aryl groups are preferred. Such polymers are typified by polyethylene, polypropylene, ethylene-propylene copolymer, vinyl polymers, polyacrylates, uncured polyepoxide resins and unsaturated polyester resins. Others will be apparent to anyone skilled in the polymer art.

Additionally, however, the molecular weight of a given polymer determines in large part its solubility in wax. Generally, the molecular weight of the polymer useful in accordance with the invention will be no greater than about 500,000 and in some cases much less. In any event, the wax solubility of a given polymer is readily determined by simply heating and mixing the polymer in solution with an appropriate amount of wax.

The waxes which are preferred in the composition of this invention are petroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between 120° F. and about 145° F., preferably between about 125 and 140° F. Microcrystalline waxes which contain only minor amounts of normal paraffins and largely predominate in highly branched naphthenic waxes have melting points in the order of 130–160° F., usually between 140 and 150° F.

The higher melting point paraffin waxes are especially useful in many coating compositions: heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility.

It is normal experience in designing wax compositions to find it necessary to combine several waxes together in a single composition. The purpose of this, of course, is to obtain the beneficial properties inherent in each particular type of wax or to minimize adverse properties of other waxes so included.

As the wax to be preblended with the polymer cement, it is preferred to employ paraffinic waxes instead of microcrystalline waxes since the former do not adversely affect the recovery of the wax-polymer by coagulation of the wax-polymer cement.

The amount of wax to be preblended with the polymer may be as little as 5% by weight, basis polymer, or as much as 20% by weight, basis polymer. Below the lower limit, the advantages of preblending are considerably reduced. Above the maximum limit, the inclusion of wax seriously interferes with recovery of the wax-polymer preblend especially when coagulation means of recovery are used. Preferably the amount of wax in the preblend should be from about 7.5% to about 15.0% wax, basis polymer, and still more preferably about 10% wax.

The invention is advantageous for ultimate wax-polymer blends in which the amount of polymer exceeds about 5% of the total composition weight. It is, however, particularly advantageous for the preparation of final wax-polymer compositions containing 10–80% polymer and preferably 15–50% by weight polymer. The wax or waxes used for preblending need not, however, be the same as the wax or waxes which are subsequently added to the preblend.

After recovery of the preblend of wax and polymers and removal of solvent therefrom, the preblend is mixed with additional units of wax by any of several means well known in the art. For example, extruders, Banbury mixers, kneading devices and the like can all be used.

The wax and wax-polymer preblend may be fed to the mixing device in either the solid or molten state. However, in some devices, either or both of the feeds may be in the solid state, the input energy of mixing being the source of energy to bring the materials to a molten or at least semi-molten state from which the required degree of homogeneity can be obtained by further mixing.

The invention will be more clearly understood by reference to the following examples.

EXAMPLE I

Separate samples of (1) neat pelletized ethylene-propylene copolymers and (2) pelletized ethylene-propylene copolymer containing 10% by weight of high melting point petroleum residual paraffinic wax were prepared and introduced into a circulating mixing system containing an amount of petroleum wax sufficient that, when each sample was blended therewith, the composition of the mixture was 75% by weight wax and 25% by weight polymer. The polymer contained 88–90% by weight ethylene monomeric units and had an intrinsic viscosity between 2 and 4.

The mixing apparatus comprised a closed cylindrical mixing chamber 6 inches in diameter by 12 inches long in which two four-bladed meshing impellers rotated at a constant speed of about 30 r.p.m. The temperature of the materials being mixed was maintained at 210° C. throughout the test.

Upon introducing the polymeric materials into the wax, each of the systems was sampled at periodic intervals to determine the relative heterogeneity of each system.

The relative heterogeneity of each sample was determined by passing each sample at a constant rate and temperature through a capillary melt viscometer having a zero length capillary (knife-edged orifice) at its outlet. Fluctuations in the force required to pass each sample through the small (0.5 mm.) orifice were then recorded since they constitute a quantitative indication of the occurrence of heterogeneities in the sample. The results of the test were as follows:

|                    | Mixing Time, minutes, after all polymer added to wax |      |      |     |     |     |     |
|--------------------|------|------|------|-----|-----|-----|-----|
|                    | 13   | 15   | 17   | 20  | 25  | 30  | 35  |
|                    | Load Fluctuation, Percent of Average load |||||||
| Neat Polymer       | 40   | 16   | 10.5 | 7.5 | 6.5 | 6.2 | 6.2 |
| Polymer+10% wax    | 40   | 12.5 | 7.3  | 0.7 | 0.6 | 0.6 | 0.6 |

These data indicate quite graphically that preblending of only 10% wax (2.5% of the total wax in the final blend) yields definitely more rapid mixing under identical test conditions. In addition greater homogeneity is apparently obtained even after an extended mixing time.

The amount of wax preblended with the polymer exerts a profound effect not only on the subsequent blending of the polymer into wax but also on the recovery of the polymer from solution. This is illustrated by the following examples.

EXAMPLE II

Two experiments were conducted to examine the behavior of neat polymer and wax-polymer mixtures when they are recovered from a solvent solution by steam coagulation. In each test, a solution of 4.5% by weight ethylene-propylene copolymer (90% ethylene monomeric units) in benzene and a solution of 10.4% by weight high melting point paraffin wax in benzene were blended at above 60° C. to form a solution of the two in benzene in which the ratio of wax to polymer was 70/30.

Each of these solutions was passed to a closed coagulation vessel into which steam was passed to effect coagulation of the wax-polymer from the benzene solvent. Upon completion of coagulation, the resultant crumb was steam-stripped and passed to a dryer wherein it was heated at 80° C. to remove water and residual amounts of solvent. The pertinent operating conditions of the coagulation and drying steps were as follows:

|  | Test No. 1 | Test No. 2 |
|---|---|---|
| Feed Rate, grams/min | 700 | 350 |
| Coagulating Steam, grams/min | 400 | 350 |
| Stripping Steam, grams/min | 190 | 200 |
| Coagulating Temperature, °C | 91–99 | 93 |
| Stripping Temperatuze, °C | 98.5 | 99 |
| Drying Temperature, °C | 80 | 88 |

The crumb from Test No. 1, after more than two hours drying time, still contained 23 phr. of retained water. In Test No. 2, despite the fact that both more severe stripping and drying conditions were employed, the "dried" crumb was still unsatisfactory in that it contained 17 phr. retained water after two hours' drying time.

EXAMPLE III

Two further experiments were conducted to determine the effect of preblended wax concentration in the polymer upon recovery of the preblended wax-polymer solution by steam coagulation. In one test, a 7.5% by weight polymer cement was employed. In the other, a cement combining 7.5% by weight polymer and wax, the ratio of polymer to wax being 9 to 1. The wax was a high melting point paraffinic wax.

Each of these solutions was passed separately to a closed coagulation vessel into which steam was passed to effect coagulation of polymer or polymer-wax solution. Upon completion of coagulation, the resultant crumb was steam-stripped and passed to a dryer to remove water and residual amounts of solvent. The most pertinent operating conditions of the coagulation and drying steps were as follows:

|  | Test No. 3, Neat Copolymer | Test No. 4, Copolymer plus 10% wax |
|---|---|---|
| Feed Rate, cc./min | 700 | 600 |
| Coagulating steam, grams/min | 210 | 180 |
| Stripping Steam, grams/min | 170 | 170 |
| Coagulating Temperature, °C | 95 | 91 |
| Stripping Temperature, °C | 99 | 99 |
| Drying Temperature, °C | 90–110 | 90–110 |

The crumb from both tests was dried for an equal length of time at the end of which both were found to be essentially completely dry, i.e., they contained no measurable quantities of water. Thus by comparison of tests 2 and 4, it is clearly shown that the amount of wax preblended in the polymer before recovery exerts a profound effect on the recovery of the polymer by coagulation means. It is therefore preferred that not more than about 20% by weight wax be preblended with the polymer according to the invention in order that satisfactory polymer recovery can be obtained.

However, it has also been found that the type of wax also exerts an important effect on polymer recovery from solutions.

EXAMPLE IV

A series of several tests were made in accordance with the procedures of Example III except that, instead of using a paraffinic wax, a microcrystalline wax was preblended with the polymer. Despite repeated attempts to obtain satisfactory coagulation and considerable "juggling" of the operating conditions to reach optimum operating conditions, satisfactory coagulation of the polymer containing 10% by weight microcrystalline wax was not attained. In each case, the coagulant "balled up," i.e., agglomerated to the point of fouling instead of forming a crumb which could be easily removed from the system. Both the coagulator vessel and the steam jets were fouled by the sticky mass formed by attempts to coagulate the polymer containing 10% by weight of preblended microcrystalline wax.

We claim as our invention:

1. A process of blending ethylene-propylene copolymer and wax compositions comprising the steps (a) preblending an amount of paraffinic wax corresponding to from about 5 to about 20% by weight of the copolymer, into a solution of copolymer in a volatile, inert, wax dissolving hydrocarbon solvent having a copolymer concentration of less than 30%, (b) recovering the blend of copolymer containing from about 5 to about 20% by weight paraffinic wax by coagulation and solvent removal and (c) blending the preblended copolymer and paraffinic wax with an additional amount of wax in at least a semi-molten state to form a wax-copolymer composition containing from 10–80% by weight copolymer.

2. The process of claim 1 in which the amount of paraffinic wax preblended with the copolymer is from about 7.5 to about 15% by weight of the polymer.

3. The process of claim 1 in which the amount of paraffinic wax preblended with the copolymer is about 10% by weight of the copolymer.

4. The process of claim 1 in which the amount of copolymer is from 15 to 50% by weight of the total wax-copolymer composition.

References Cited
UNITED STATES PATENTS

| 2,290,393 | 7/1942 | Thomas | 260—28.5 |
| 2,504,270 | 4/1950 | MacLaren | 260—28.5 |
| 2,706,719 | 4/1952 | Newberg | 260—28.5 |
| 2,595,911 | 5/1952 | Young | 260—28.5 |
| 2,761,851 | 9/1956 | Joanen | 260—28.5 |
| 3,201,362 | 8/1962 | Mark | 260—28.5 |
| 3,210,305 | 10/1965 | Coenen | 260—28.5 |

MORRIS LIEBMAN, Primary Examiner.

JULIUS FROME, Examiner.